United States Patent Office 3,258,478
Patented June 28, 1966

3,258,478
HYDRAZINE SALTS OF NITRAMINES AND METHOD FOR PREPARING SAME
Kurt Baum, South Pasadena, Calif., assignor to Aerojet-General Corporation, Azusa, Calif., a corporation of Ohio
No Drawing. Filed Sept. 8, 1964, Ser. No. 395,644
20 Claims. (Cl. 260—482)

This invention relates to a novel class of hydrazine salts and to their method of preparation.

Previously many different compounds have been proposed for use as oxidizers in solid propellants. However, it has been found that many of these compounds do not provide as high a burning rate and specific impulse as is desired in the modern solid fuel rockets. The preparation of solid propellants possessing increased burning rate and specific impulse has assumed greater importance in recent years, in view of the national effort to explore the outer reaches of the earth's atmosphere and to land scientific instruments and human beings on other planets.

Many of the previous attempts to solve these problems by employing oxidizers heretofore proposed for solid propellants have not been successful because the compounds were found to be very sensitive to impact, rendering them dangerous to handle.

It has now been found according to my invention that solid propellants possessing the desired improved burning rate and specific impulse may be obtained by utilizing certain novel hydrazine salts as the oxidizer. These novel oxidizers do not possess the impact sensitivity previously associated with high energy oxidizers.

It is an object of this invention to prepare a novel class of hydrazine salts prepared by the reaction of organic nitramines with hydrazine. It is another object of this invention to provide a novel and superior class of oxidizers for use in solid rocket propellants. It is a further object of this invention to prepare these compounds by a novel method. These and other objects of this invention will be apparent from the detailed description which follows.

The novel hydrazine salts of this invention have the following general formula:

$$Q\text{\textlbrackdbl} N-NO_2^\ominus \cdot N_2H_5^\oplus \text{\textrbrackdbl}_n$$

wherein Q is hydrogen or an organic radical having a valency equal to $n$, and $n$ is an integer of from 1 to 2. Typically, Q may be a monovalent organic radical such as aryl, alkyl, alkoxycarbonyl—

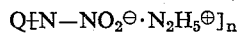

wherein R is alkyl, preferably lower alkyl of from 1 to about 8 carbon atoms—or carbamoyl

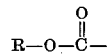

or a divalent organic radical such as alkylene and arylene. In general, when Q is organic, the group contains from 1 to about 12 carbon atoms.

Illustrative Q groups are phenyl, naphthyl, methyl, ethyl, isopropyl, octyl, decyl, dodecyl, ethoxycarbonyl, propoxycarbonyl, butoxycarbonyl, methylene, ethylene, pentamethylene, decamethylene, phenylene and tolylene.

The compounds of this invention are prepared in accordance with the following general reaction equation:

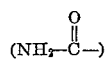

wherein Q and $n$ are as defined above.

Illustrative of the nitramine reactants and hydrazine salts which may be involved in the foregoing reaction are those set forth in Table I below.

TABLE I

| Nitramine | Hydrazine Salt |
|---|---|
| Methylene Dinitramine | Hydrazine Salt of Methylene Dinitramine. |
| Propylene Dinitramine | Hydrazine Salt of Propylene Dinitramine. |
| Decamethylene Dinitramine | Hydrazine Salt of Decamethylene Dinitramine. |
| Ethyl Nitramine | Hydrazine Salt of Ethyl Nitramine. |
| Butyl Nitramine | Hydrazine Salt of Butyl Nitramine. |
| Dodecyl Nitramine | Hydrazine Salt of Dodecyl Nitramine. |
| N-Nitro Ethyl Carbamate | Hydrazine Salt of N-Nitro Ethyl Carbamate. |
| N-Nitro Pentyl Carbamate | Hydrazine Salt of N-Nitro Pentyl Carbamate. |
| N-Nitro Hexyl Carbamate | Hydrazine Salt of N-Nitro Hexyl Carbamate. |
| N-Nitro Octyl Carbamate | Hydrazine Salt of N-Nitro Octyl Carbamate. |
| Nitramine | Hydrazine Salt of Nitramine. |
| N-Nitro Urea | Hydrazine Salt of N-Nitro Urea. |

In the above reaction the hydrazine and nitramine compounds are employed in about stoichiometric amounts. Thus, where the nitramine reaction contains only one —NH—NO$_2$ group, one mole of the nitramine is used per mole of hydrazine. Where the nitramine reactant contains two such groups, two moles of hydrazine are utilized per mole of nitramine. However, the proportions of these two reactants may be varied over a wide range. The reaction may be carried out without the use of a solvent. Alternatively, a substantially inert solvent such as the alkanols; methanol, ethanol, etc., may be used in the reaction.

Conveniently, the reaction is carried out at a temperature of from about 0° C. to about 100° C. The preferred reaction temperature is from about 20° C. to about 30° C. The reaction rate may normally be increased, if desired, by varying the temperature and agitation of the reaction mixture in accordance with techniques familiar to those skilled in the art.

The novel compounds of this invention may be isolated by conventional means, such as by evaporation from solution, or if the salt is insoluble, by filtration. It is sometimes advantageous to carry out the recovery step under vacuum in order to expedite this procedure. However, the reaction itself is usually conducted at atmospheric pressure. Of course, the pressure is not critical and atmospheric pressure is chosen merely for the sake of convenience. Higher and lower pressures may be used without departing from the invention.

The following examples are prepared solely for the purpose of illustration and should not be regarded as limiting the invention in any way. In the examples the parts and percentages are by weight unless otherwise indicated.

*Example I.—Hydrazine salt of methylene dinitramine*

A solution of 0.150 mole of hydrazine in 25 ml. of methanol was added dropwise to 10.2 grams (0.075 mole) of methylene dinitramine in 75 ml. of methanol at 10° C. A slightly yellow precipitate was formed, which was filtered, washed with cold methanol, and dried under vacuum for 2 hours. The product consisted of 12.8 grams (86 percent yield) of the hydrazine salt of methylene dinitramine, M.P. 146° C. (subl.) with a crystalline phase change at 110° C. Density—1.69.

*Analysis.*—Calc'd for $CH_{12}N_8O_4$: C, 6.00; H, 6.00; N, 56.00. Found: C, 5.60; H, 6.85; N, 56.80.

*Example II.—Hydrazine salt of butyl nitramine*

A solution of 0.02 mole of hydrazine was added dropwise to 2.36 grams (0.02 mole) of butyl nitramine in 30 ml. of methanol at 15 to 20° C. No precipitate formed. The solution was evaporated to dryness at 20 mm. Hg to give a white solid which was dried under vacuum. The product had a melting point of 75 to 78° C.

*Example III.—Hydrazine salt of N-nitro ethyl carbamate*

A methanol solution of 0.02 mole of hydrazine is added dropwise to 0.02 mole of N-nitro ethyl carbamate in 30 ml. of ethanol at 15 to 20° C. The solution is evaporated to dryness at 20 mm. Hg to give a solid which is dried under vacuum. The product, the hydrazine salt of N-nitro ethyl carbamate, possessed excellent impact-stability.

When the foregoing example is repeated using N-nitro tertiary butyl carbamate in lieu of N-nitro ethyl carbamate, the hydrazine salt of N-nitro tertiary butyl carbamate is obtained in good yield.

*Example IV.—Hydrazine salt of N-nitro urea*

A solution of 0.02 mole of hydrazine is added dropwise to 0.02 mole of N-nitro urea in about 50 ml. of methanol at about 20 to 30° C. The solution is evaporated to dryness at 20 mm. Hg to give a solid. After the product was dried under vacuum, the essentially pure hydrazine salt of N-nitro urea was found to possess good impact stability.

*Example V.—Hydrazine salt of pentamethylene dinitramine*

A solution of 0.150 mole of hydrazine in 25 ml. of methanol is added dropwise to 0.075 mole of pentamethylene dinitramine in about 75 ml. of methanol at 20° C. A precipitate is formed, which is filtered, washed with cold methanol, and dried under vacuum for about 2 hours. The product consisted of about 10 grams of the hydrazine salt of pentamethylene dinitramine.

*Example VI.—Hydrazine salt of hexyl nitramine*

A solution of 0.02 mole of hydrazine is added dropwise to 0.02 mole of hexyl nitramine in 30 ml. of methanol at 15 to 20° C. The solution is evaporated to dryness at 20 mm. Hg to give a solid. This solid product is then dried under vacuum. Elemental analysis showed the product to be the hydrazine salt of hexyl nitramine.

*Example VII.—Hydrazine salt of nitramine*

In 100 ml. of ethanol is dissolved 0.025 mole of hydrazine. This solution is added dropwise to 0.025 mole of nitramine dissolved in 40 ml. of methanol. During the addition, the temperature is maintained at about 15° C. The methanol is then removed by evaporation at about 25 mm. Hg. The product thus obtained is found by elemental analysis to be the hydrazine salt of nitramine.

The excellent impact sensitivity of the compounds of this invention may be seen from the data set forth in Table II.

TABLE II

| Compound | Impact Sensitivity, cm./2 kg. |
|---|---|
| Hydrazine Perchlorate | 2 |
| Ammonium Perchlorate | 100 |
| Hydrazine Salt of Methylene Dinitramine | 55 |
| Hydrazine Salt of Butyl Nitramine | 35 |

In Table II, the numerical values refer to the vertical height in centimeters at which a 2 kilogram weight when dropped will detonate a 10 milligram sample 50 percent of the time.

The data in Table II show that the compounds of this invention are vastly superior in impact sensitivity to the somewhat related hydrazine perchlorate, and that they approach the well-known ammonium perchlorate oxidizer in this respect.

The novel compounds of this invention may be compounded with binders, plasticizers, burning rate additives, stabilizers and the like, cured and cast to provide solid propellant of high specific impulse and good storage stability. Typical suitable ingredients for use in these propellant formulations are those set forth in United States Patent No. 3,141,294, issued July 21, 1964.

Many other propellant formulations using the compounds of this invention may be compounded in accordance with procedures familiar to those skilled in the art.

Having fully described my invention, it is intended that it be limited only by the lawful scope of the appended claims.

I claim:

1. Hydrazine salts of the formula:

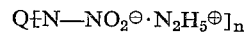

wherein Q is selected from hydrogen, alkyl, aryl, alkoxycarbonyl, carbamoyl, alkylene, and arylene radicals, $n$ is an integer of from 1 to 2 and is equal to the valence of Q.

2. Hydrazine salts of the formula:

wherein Q is a monovalent organic radical selected from the group consisting of alkyl, aryl, alkoxycarbonyl and carbamoyl.

3. The compounds of claim 2 wherein Q contains from 1 to about 12 carbon atoms.

4. Hydrazine salts of the formula:

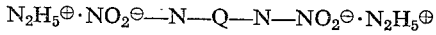

wherein Q is a divalent organic radical selected from the group consisting of alkylene and arylene.

5. The compounds of claim 4 wherein Q contains from 1 to about 12 carbon atoms.

6. The hydrazine salt of methylene dinitramine.
7. The hydrazine salt of butyl nitramine.
8. The hydrazine salt of N-nitro ethyl carbamate.
9. The hydrazine salt of N-nitro urea.
10. The hydrazine salt of pentamethylene dinitramine.
11. The method of preparing hydrazine salts of the formula:

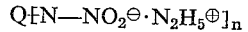

which comprises reacting hydrazine with a nitramine of the formula:

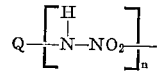

wherein in the above formulae Q is selected from the group consisting of hydrogen, alkyl, aryl, alkoxycarbonyl, carbamoyl, alkylene, and arylene radicals, $n$ is an integer of from 1 to 2 and is equal to the valence of Q.

12. The method of preparing hydrazine salts of the formula:

which comprises reacting hydrazine with a nitramine of the formula:

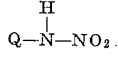

wherein in the above formulae, Q is a monovalent organic radical selected from the group consisting of alkyl, aryl, alkoxycarbonyl and carbamoyl.

13. The method of claim 12 wherein the reaction temperature is from about 0° C. to about 100° C.

14. The method of preparing hydrazine salts of the formula:

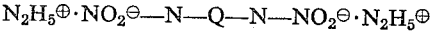

which comprises reacting hydrazine with a dinitramine of the formula:

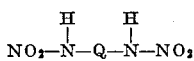

wherein in the above formulae, Q is a divalent organic radical selected from the group consisting of alkylene and arylene.

15. The method of claim 14 wherein the reaction temperature is from about 0° C. to about 100° C.

16. The method of preparing the hydrazine salt of methylene dinitramine which comprises reacting hydrazine with methylene dinitramine.

17. The method of preparing the hydrazine salt of butyl nitramine which comprises reacting hydrazine with butyl nitramine.

18. The method of preparing the hydrazine salt of N-nitro ethyl carbamate which comprises reacting hydrazine with N-nitro ethyl carbamate.

19. The method of preparing the hydrazine salt of N-nitro urea which comprises reacting hydrazine with N-nitro urea.

20. The method of preparing the hydrazine salt of pentamethylene dinitramine which comprises reacting hydrazine with pentamethylene dinitramine.

References Cited by the Examiner
UNITED STATES PATENTS 2,963,507  12/1960  Rudner et al. ____ 260—465.5 X
3,081,595   3/1963  Rose _____ 60—35.4

MILTON WEISSMAN, *Primary Examiner.*

REUBEN EPSTEIN, *Examiner.*

L. A. SEBASTIAN, *Assistant Examiner.*